United States Patent [19]
Eskandry et al.

[11] 4,430,645
[45] Feb. 7, 1984

[54] SURVEILLANCE SYSTEM EMPLOYING A DUAL FUNCTION FLOOR MAT RADIATOR

[75] Inventors: Ezra D. Eskandry, Pompano Beach; Jon N. Weaver, Boca Raton, both of Fla.

[73] Assignee: Sensormatic Electronics Corporation, Deerfield Beach, Fla.

[21] Appl. No.: 251,933

[22] Filed: Apr. 7, 1981

[51] Int. Cl.³ .................................. G08B 13/24
[52] U.S. Cl. ................................ 340/572; 340/562; 343/6.5 SS
[58] Field of Search .............. 340/572, 562; 343/6.5 SS, 700 MS, 725, 785, 894, 897, 911 R

[56] References Cited

U.S. PATENT DOCUMENTS

| | | | |
|---|---|---|---|
| 2,039,988 | 5/1936 | Graves, Jr. | 343/897 |
| 3,016,536 | 1/1962 | Fubini | 343/897 X |
| 3,493,955 | 2/1970 | Minasy | 340/572 |
| 3,500,373 | 3/1970 | Minasy | 340/572 |
| 3,707,711 | 12/1972 | Cole et al. | 340/572 |
| 3,868,669 | 2/1975 | Minasy | 340/572 |
| 3,895,368 | 7/1975 | Gordon et al. | 340/572 |
| 4,072,952 | 2/1978 | Demko | 343/700 MS |
| 4,095,214 | 6/1978 | Minasy | 340/572 |
| 4,135,184 | 1/1979 | Pruzick | 340/572 |
| 4,139,844 | 2/1979 | Reeder | 340/572 |
| 4,157,548 | 6/1979 | Kaloi | 343/700 MS |
| 4,170,013 | 10/1979 | Black | 343/700 MS |
| 4,260,988 | 4/1981 | Yanagisawa et al. | 343/700 MS |
| 4,281,321 | 7/1981 | Narlow et al. | 340/572 |
| 4,302,846 | 11/1981 | Stephen et al. | 340/572 X |
| 4,303,910 | 12/1981 | McCann | 340/572 |

OTHER PUBLICATIONS

Bahl, I. J. et al., *Microstrip Antennas*, pp. 157–163, Artech House.

*Primary Examiner*—Glen R. Swann, III
*Attorney, Agent, or Firm*—Hopgood, Calimafde, Kalil, Blaustein & Judlowe

[57] ABSTRACT

A microstrip antenna is incorporated in a floor mat, the latter consisting of a conductive grid laminated to a conductive sheet with a layer of dielectric material therebetween to form a capacitor. The microstrip antenna is connected to a source of microwave energy for the purpose of radiating a microwave signal through a surveillance area. A low frequency signal is applied to the capacitor section of the mat for direct capacitive coupling through the body of a pedestrian to any surveillance tag carried thereupon.

15 Claims, 3 Drawing Figures

SURVEILLANCE SYSTEM EMPLOYING A DUAL FUNCTION FLOOR MAT RADIATOR

BACKGROUND OF THE INVENTION

The present invention relates to apparatus for pilferage control. More particularly, it is directed to apparatus for detecting the presence of a telltale element in an unauthorized zone.

For the purpose of controlling pilferage, it has been proposed heretofore to secure specially constructed tags to the articles to be protected which tags must be deactivated or removed for authorized removal of the articles from the controlled area. In U.S. Pat. No. 3,895,368 issued to Lloyd L. Gordon and Robert D. Williamson for "Surveillance System and Method Utilizing Both Electrostatic and Electromagnetic Fields", and assigned to the same assignee as the present application, there is described apparatus in which a microwave signal generator projects an electromagnetic wave into a space under surveillance to establish a first field. A pulse or frequency modulated low frequency generator is used to apply a voltage to a discontinuous conductor for establishing a second field, electrostatic in nature, throughout the space. Presence in the space of a miniature, passive, electromagnetic wave receptor-reradiator in the form of a semi-conductive diode connected to a dipole antenna causes the reradiation of the low frequency component modulated on the microwave component as a carrier. The front end of a receiver system is tuned to the microwave frequency signal. A coincidence circuit energizes an alarm circuit whenever the detected signal coincides with the original modulation envelope being applied to the low frequency generator. The patent contains a general statement that the discontinuous conductor may be extended across the areaway being protected and that a grounded conductor may be located in the floor in order to provide a return path for the electrostatic signals, if necessary. In a preferred embodiment described in said patent, pedestals are located on opposite sides of the areaway to be protected which pedestals contain foil elements for establishing the electrostatic field. In a specific example, the foil elements are mentioned as being 4"×4" in size, and energized by a 245 V RMS signal.

It was found, however, that when the electrostatic field radiators are located in the side pedestals above the floor level, it is difficult to confine the electrostatic field to the precise area desired to be controlled between the pedestals. When the radiated energy extends beyond the desired boundaries, it is referred to as overranging. Overranging is undesirable since it cuts down on the floor space adjacent the controlled areaway where tagged articles can be located legitimately or may be transported by someone without tripping an alarm.

In the copending application of Douglas A. Narlow and James G. Farrar, Ser. No. 157,848, filed June 9, 1980, entitled "Surveillance System Employing a Floor Mat Radiator", now U.S. Pat. No. 4,281,321, and assigned to the same assignee as the present application, there is disclosed apparatus of the type described in the aforesaid Gordon et al. patent in which overranging due to the inability to confine the electrostatic field to the desired space has been greatly reduced, if not eliminated. A floor mat consisting of a conductive grid laminated to a conductive sheet with a layer of dielectric material therebetween to form a capacitor is disposed between the pedestals that house means for radiating a microwave signal through a surveillance area. A low frequency signal is applied to the capacitor mat for direct capacitive coupling through the body of a pedestrian to any surveillance tag carried thereupon. While the use of said mat reduces the overranging problem, it still leaves the pedestal as an essential component in the areaway or walkway. Such pedestals are particularly objectionable where it is desired to control a narrow walkway or where it is desired to avoid the introduction of any obstacles in the path of those entering or exiting from the area to be controlled.

SUMMARY OF THE INVENTION

The present invention provides apparatus of the type described above that eliminates the pedestals without reducing the efficacy of the surveillance system. In accordance with the invention there is provided a surveillance system for detecting the presence in a controlled space of a miniature electromagnetic wave receptor-reradiator with signal mixing capability, comprising in combination means for propagating through said space an electromagnetic microwave signal, a source of low frequency signals, an electrode coupled to said source of low frequency signals for disposition along the path of travel of said receptor-reradiator through said space for direct capacitive coupling to said receptor-reradiator whenever the latter is present in said space, signal detecting means arranged to be coupled to said space for receiving signals therefrom and detecting signals related to said low frequency signals only when received as modulation on a carrier signal whose frequency bears a predetermined relationship to that of said microwave signals, and means coupled to said detecting means for providing an alarm responsive to detection of said signals that are related to said low frequency signals, characterized in the said means for propagating a microwave signal through said space comprises a microstrip antenna with a signal feed constructed and arranged to propagate said signal through said space.

BRIEF DESCRIPTION OF THE DRAWINGS

The invention will be better understood after reading the following detailed description of the presently preferred embodiment thereof with reference to the appended drawings in which.

The same reference numerals are used throughout the drawings to designate the same or similar parts.

DESCRIPTION OF THE PREFERRED EMBODIMENT

Figure 1:
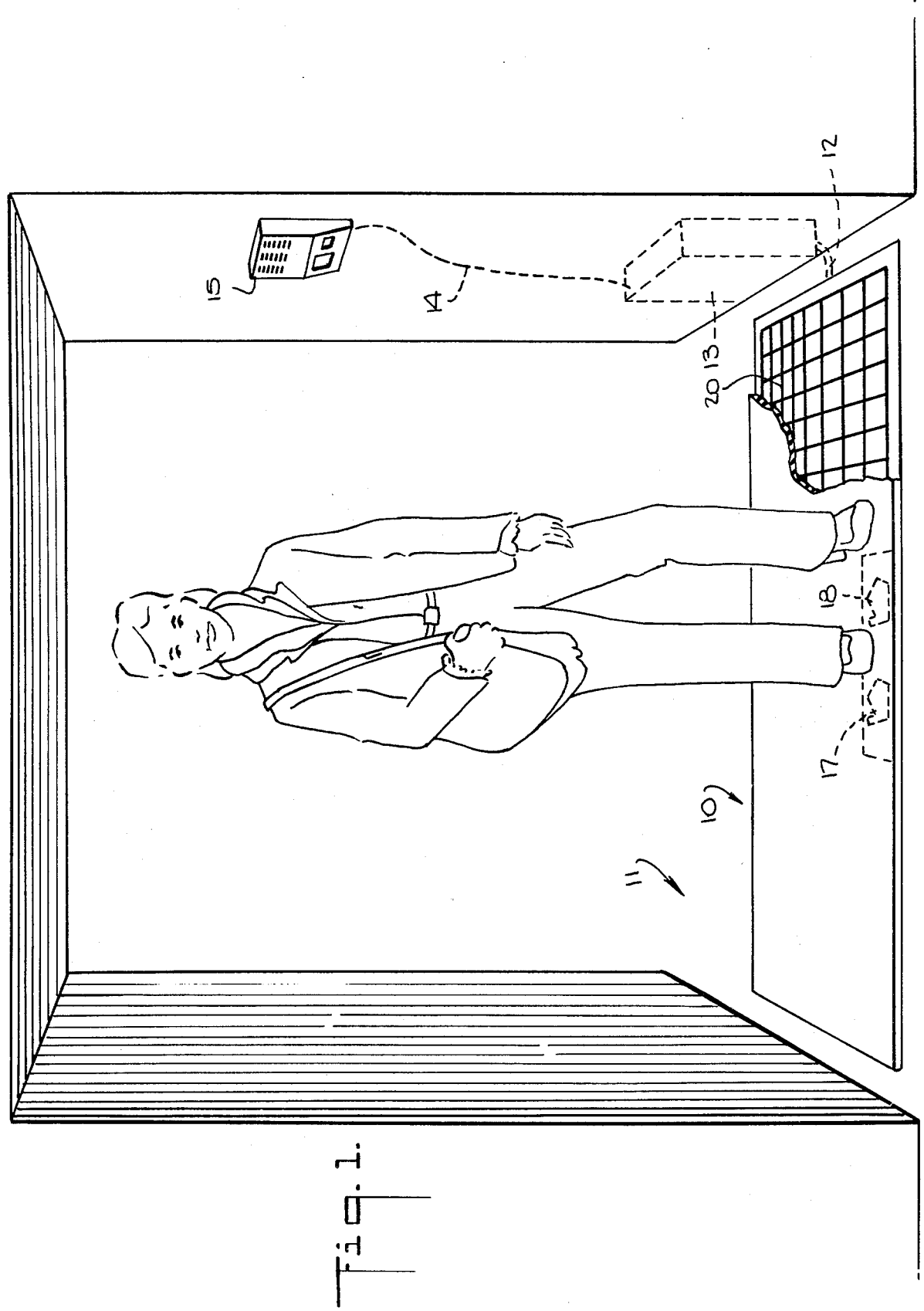
FIG. 1 is a perspective view of an installation embodying the present invention.

Referring now to the drawings, there is shown in FIG. 1 a typical installation consisting of a mat assembly 10 disposed on the floor within a walkway or passageway 11 connected by a concealed cable 12 to a concealed electronic control box 13 which, in turn, is connected by a cable 14 to an alarm annunciator 15. The annunciator 15 is located where it can be observed by security personnel. In the example illustrated, it is shown mounted on the wall of the walkway 11. The walkway 11 may, for example, constitute the passageway at the exit from a retail establishment to insure that merchandise is not removed from the retail space without authorization. Alternatively, it can be located anywhere within the establishment to control the unauthorized movement of merchandise from one sales area to another. Obviously, the system can be used anywhere and in connection with any type of operation wherein it is desired to detect the unauthorized transport of articles from one location to another.

As shown in FIG. 1 the mat 10 straddles the walkway 11 where a pedestrian must tread when passing through the controlled space. If the individual shown were to be carrying a concealed article tagged with a receptor-reradiator of the type mentioned above, the system would provide an alarm.

Operation will be substantially as described in the aforesaid Narlow et al. application with the concealed conductive grid electrode 20 in the floor mat 10 producing an electrostatic field that is communicated through the body of the pedestrian to the receptor-reradiator. In accordance with the present invention, however, the electromagnetic microwave signal is propagated through the space to be controlled by energizing the microstrip antenna elements 17 and 18 that are also concealed within the mat 10.

Figure 2:
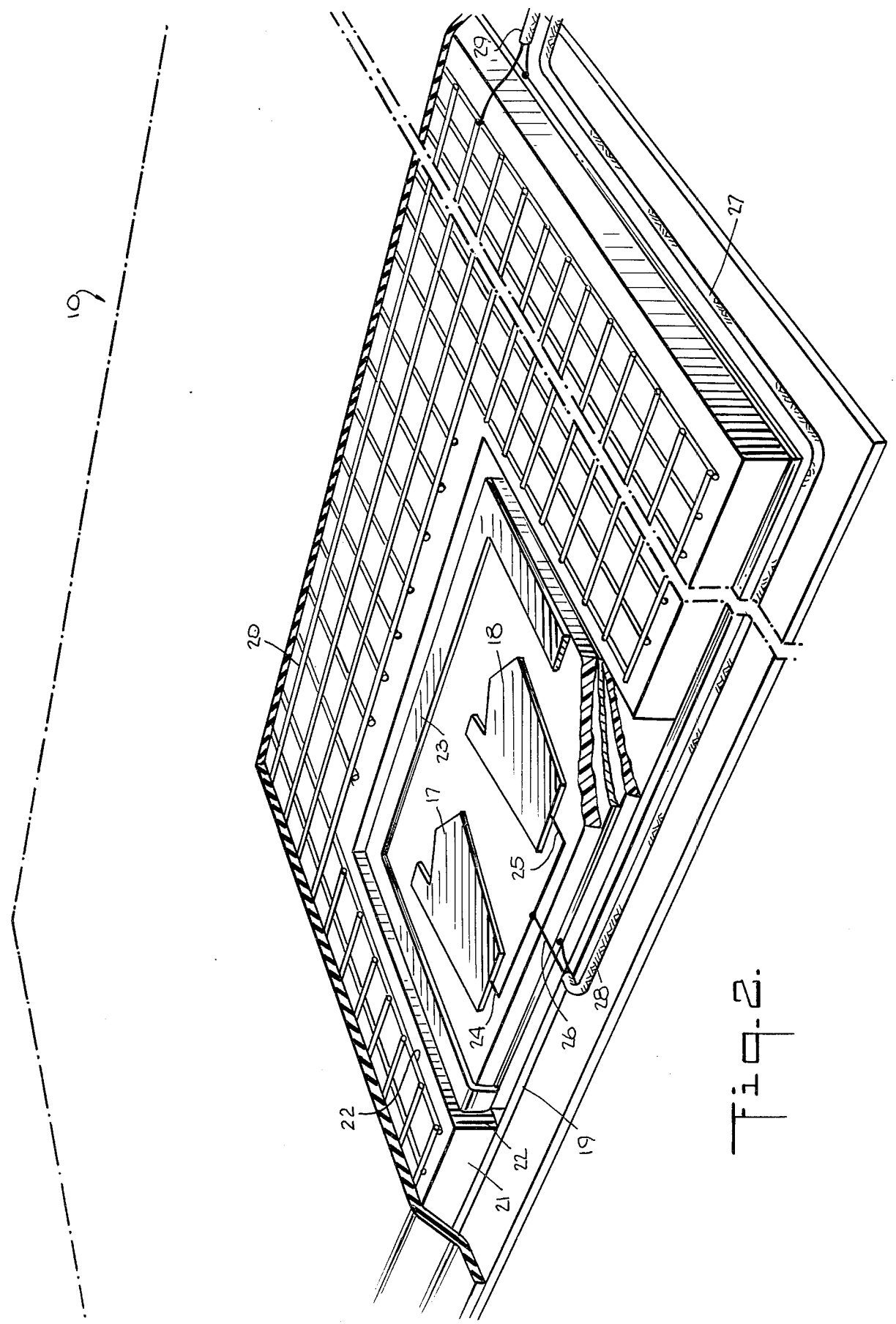
FIG. 2 is a view of a floor mat containing both the electrode for direct capacitive coupling to the receptor-reradiator and the microstrip antenna for use in the installation of FIG. 1.

The details of the mat 10 will now be described with reference to FIG. 2 to which attention should be directed. As seen therein, the mat 10 consists of a conductive ground plane sheet 19, an open grid electrode layer 20, and a layer of dielectric material 21 sandwiched between the grid 20 and the conductive sheet 19. One border of the grid electrode 20 and underlying dielectric layer 21 is cut back or indented at 22. The two strip conductor elements 17 and 18 of the microstrip antenna are disposed substantially in the plane of the grid 20, inset within the space embraced by the indented margin 22 but spaced from said margin. If the strip conductor elements 17 and 18 are formed on one surface of a conventional printed circuit board whose undersurface is provided with a continuous conductive layer, the entire printed circuit assembly may be inset within the space provided by the above indentation as shown in FIG. 2. However, the conductive layer backing of the printed circuit board is preferably insulated from the sheet 19 to ensure avoidance of undesired crosstalk from the electrostatic field radiator. Alternatively, the dielectric layer 21 may be continuous throughout the entire rectangular area of the mat and the strip conductor elements 17 and 18 may be formed thereon by any suitable process. In such case, the underlying section of sheet 19 should be separated and insulated from the remainder of sheet 19 to provide an isolated ground plane for the microstrip antenna. Also, as shown in FIG. 2 a rectangular three-sided guard electrode 23 is disposed around the strip conductor elements 17 and 18 spaced therefrom as well as from the margin 22 of the grid 20.

Still referring to FIG. 2 it will be seen that the strip conductor elements 17 and 18 are provided with respective signal feed connections 24 and 25. By proper location of the feed points in known manner with reference to the edge of the corresponding strip conductor element, the correct phasing for circular polarization of the radiated energy can be obtained. Such radiation pattern is desired in the practice of the present invention. The two feed points 24 and 25 are connected in parallel to the inner conductor 26 of a shielded cable 27 for receiving the microwave energy therefrom. The shield 28 of the cable 27 should be connected to the ground plane of the antenna, i.e., the conductive backing layer of the printed circuit board if such construction is employed or the isolated conductive section of the sheet 19 which was referred to above. Such ground plane should also be connected in any suitable manner to the guard electrode 23.

A typical mat can be constructed in the following manner. To a thin rectangular aluminum sheet approximately 30"×36" is laminated a ⅛" thick layer of an ABS resin dielectric material. To this is secured a thin rectangular section of screening serving as grid electrode 20. Along one of the longer edges of the rectangular structure thus produced the grid is cut back to provide the indented margin 22 while the ABS dielectric is cut away to form a rectangular cavity approximately 6"×12" into which is inset a printed circuit board formed on 1/16" thick G-10 fiberglass. The exposed conductive surface of the printed circuit board is formed as shown in FIG. 2 of the drawing while the undersurface is coextensive with the inset element. Appropriate dielectric spacers are preferably introduced between the printed circuit board and the aluminum sheet 19 in order that the strip conductor elements 17 and 18 and guard strip 23 lie approximately in the same plane as the grid 20. Alternatively, thinner sheets of dielectric material can be disposed both under and above the printed circuit board to insulate the latter from sheet 19 and to provide a flush upper surface for pedestrian traffic. The assembly thus produced is sealed within coating or potting layers of polyurethane material to encapsulate the same, protecting it from damage by moisture and the like. A layer of elastomeric material of any known composition having the quality of withstanding wear and being a good insulator covers and conceals the working parts of the mat. The elastomeric layer may or may not be bonded to the remainder of the mat as desired. The shielded cable 27 may be fastened in any suitable manner around the periphery of the mat to a suitable point of exit for connection to the electronic control box 13. A separate shielded cable 29 is connected to the ground plane 19 and grid 20 in the manner disclosed in the aforesaid Narlow et al. application.

Figure 3:
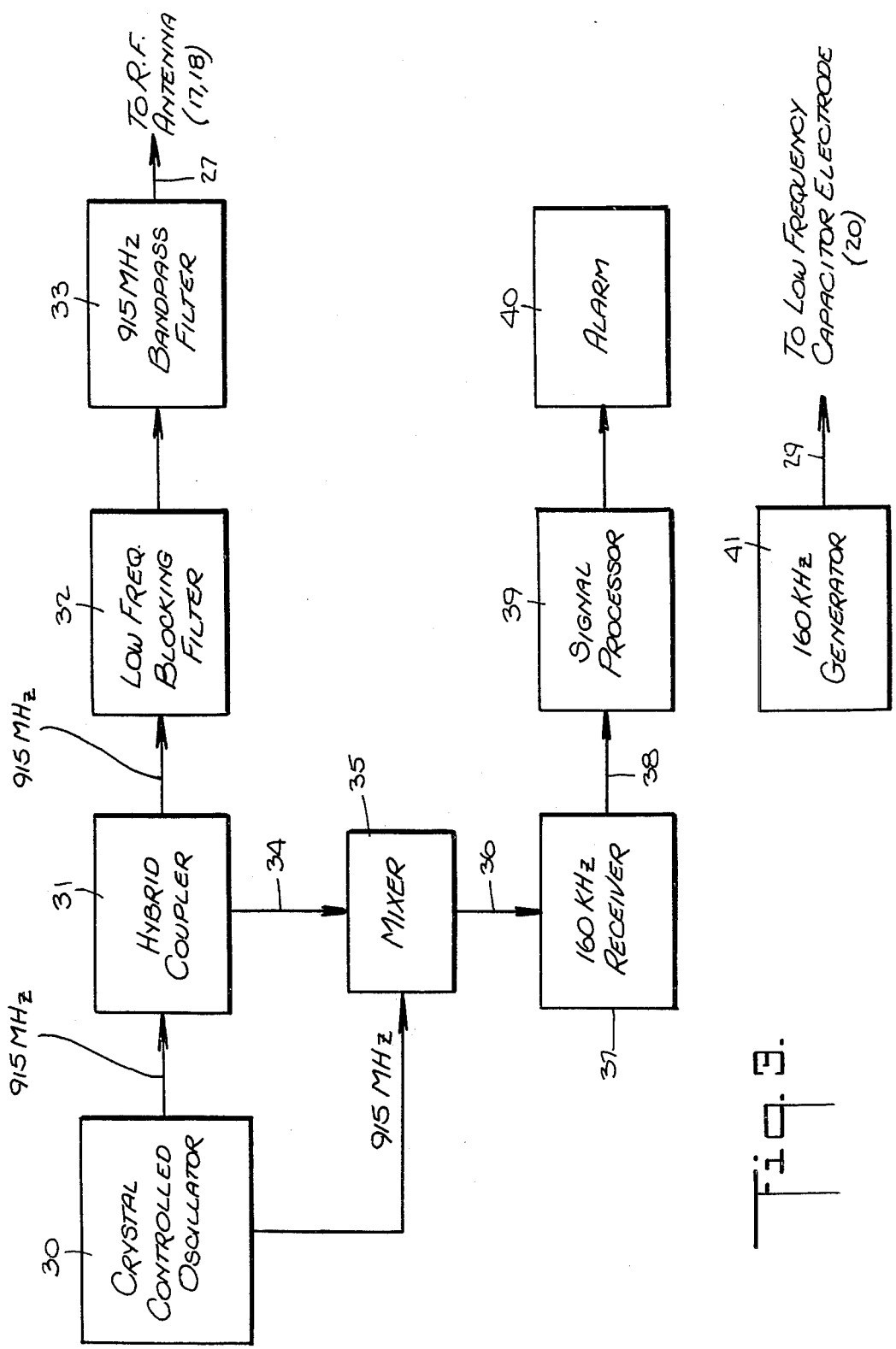
FIG. 3 is a block diagram of a typical circuit for use with the mat assembly of FIG. 2 in the installation of FIG. 1.

Referring now to FIG. 3, there is shown therein the control circuitry that is included within the electronic control box 13. Such circuitry may consist of a crystal controlled oscillator 30 feeding a hybrid coupler or circuit 31 which, in turn, feeds the microstrip antenna elements 17 and 18 through a low frequency blocking filter 32 and a 915 MHz bandpass filter 33 and shielded cable 27. In the present example the output signal from the crystal controlled oscillator 30 is at a frequency of 915 MHz and energizes the microstrip antenna elements to propagate through the space to be controlled an electromagnetic microwave signal. When a receptor-reradiator (not shown) is present in the space that is illuminated by the microstrip antenna that includes elements 17 and 18, said receptor-reradiator will be linked by the energy radiated from said antenna and a reradiated component of the radiated signal will be received by the same antenna elements 17 and 18 and fed back to the hybrid coupler 31. Incoming signals reaching the hybrid coupler 31 will leave over the output path 34 to one input of a mixer 35 that has a second input furnished with signals from the crystal controlled oscillator 30 at the transmitted frequency of 915 MHz.

The mixer 35 has an output at 36 feeding a signal to a 160 KHz receiver 37 which, in turn, has an output at 38 coupled through a signal processor 39 to an alarm 40.

As described in the above-identified Narlow et al. application, it is necessary for a low frequency signal to be modulated upon the microwave carrier signal in order to energize the alarm circuit. For this purpose, there is also provided in the present system a low frequency signal source, which in the subject example is shown as consisting of a 160 KHz generator 41 whose output is connected through the cable 29 to the capacitor portion of the mat 10. The generator 41 may be constructed in any well-known manner and be provided with appropriate means, such as that taught in the above Narlow et al. application, for matching the impedance and tuning to resonance the load circuit including the capacitor constituted by grid 20 and ground plane 19.

When a tag (receptor-reradiator) is present in the controlled space, it will cause the carrier signal received from antenna elements 17 and 18 to be modulated by the signal furnished to the grid 20 of the mat 10. That is, a 160 KHz signal will be modulated on the 915 MHz carrier signal for detection by receiver 37. Additional modulation or variation of the surveillance signals may be incorporated in the system to aid in suppression of false alarms. However, such modifications form no part of the present invention and need not be described. Referring further to FIG. 3 it should be apparent to those skilled in the art that the blocking filter 32 and bandpass filter 33 are employed in order to insure a pure 915 MHz signal being fed to cable 27 free from any crosstalk containing signals at 160 KHz. It will also be understood that the shielded cables 27 and 29 may be integrated into a signal cable unit 12 for convenience in installation.

Having described a presently preferred embodiment of the subject invention, it should be apparent to those skilled in the art that various changes in construction may be adopted. The 160 KHz generator 41 may be replaced by the components described in the aforesaid Narlow et al. application operating at 80 KHz and relying upon the tag receptor-reradiator for doubling the frequency and returning a modulation component at 160 KHz. The number of microstrip antenna elements may be increased or decreased as desired and their location within the floor mat structure may be varied depending upon where it is desired to concentrate the radiated field pattern. As shown in FIG. 1 it is presently preferred to locate the antenna elements at the edge of the mat disposed closest to the exit from the area to be controlled so as to minimize overranging into areas where merchandise would be legitimately located. Where a wider passageway is to be controlled, additional mats may be employed and energized in parallel. The hybrid coupler may be of multiport construction with each of its outputs feeding a different mat through separate respective filters. While a rectangular mat has been illustrated, various polygonal configurations can be employed. If desired, the microstrip antenna substrate can be inset inwardly from the edge of the mat so that the printed circuit board is surrounded on all four sides by the material of the dielectric layer 21. In such case, the guard electrode 23 should also be four-sided to completely encircle the antenna elements. The printed circuit board thickness may be varied in known manner from the 1/16" dimension mentioned above.

The general construction and design of the microstrip antennas are believed to be well-known. They do not have to be pentagonal. Further information can be obtained from "Microstrip Antennas" by I. J. Bahl and P. Bhartia published by Artech House. However, the example of a pentagonal antenna described therein is characterized by a 1% bandwidth whereas the surveillance systems contemplated herein operate preferably with microwave antennas having a bandwidth of 2-3%. Such bandwidth is obtained by using a lossier dielectric material between the elements 17 and 18 and their associated ground plane. Another consideration in producing a satisfactory mat for use in the contemplated surveillance system is the loading introduced by the overlying elastomeric layer that tends to lower the resonant frequency of the microwave antenna. Hence, the design must take such loading into account. It has been found desirable to target the design of the antenna per se for about 5 MHz to 10 MHz higher than the intended frequency of operation.

Other changes will be apparent to those skilled in the art and all are intended to be incompassed herein as come within the true scope of the invention as defined in the appended claims.

What is claimed is:

1. A surveillance system for detecting the presence in a controlled space of a miniature electromagnetic wave receptor-reradiator with signal mixing capability, comprising in combination means for propagating through said space an electromagnetic microwave signal, a source of low frequency signals, an electrode coupled to said source of low frequency signals and disposed in a capacitor structure constructed and arranged for disposition in said space along the path of travel of said receptor-reradiator through said space for direct capacitive coupling to said receptor-reradiator whenever the latter is present in said space, signal detecting means arranged to be coupled to said space for receiving signals therefrom and detecting signals related to said low frequency signals only when received as modulation on a carrier signal whose frequency bears a predetermined relationship to that of said microwave signals, and means coupled to said detecting means for providing an alarm responsive to detection of said signals that are related to said low frequency signals, characterized in that said means for propagating a microwave signal through said space comprises a microstrip antenna with a signal feed constructed and arranged to propagate said signal through said space, said microstrip antenna being disposed in association with said capacitor structure in a common structure.

2. A surveillance system according to claim 1, wherein said capacitor structure is constructed and arranged for disposition on a floor where a pedestrian passing through said space is compelled to tread thereupon for capacitive coupling thereto.

3. A surveillance system according to claim 2, wherein said electrode consists of a conductive grid laminated to a conductive sheet with a layer of dielectric material therebetween, and said source of low frequency signals is coupled between said grid and said conductive sheet, further characterized in that said microstrip antenna in the form of a strip conductor separated from a conductive ground plane by a dielectric layer is disposed generally in the plane of said capacitor structure.

4. A surveillance system according to claim 3, characterized in that said microstrip antenna along with said capacitor structure are covered with a layer of insulating material and integrated into a unitary floor mat structure.

5. A surveillance system according to claim 4, characterized in that said conductive grid is polygonal with an indented margin along one border, and said strip conductor of the microstrip antenna is disposed substantially in the plane of said grid inset within the space embraced by said indented margin but spaced from said margin, and said conductive ground plane is formed by an isolated section of said conductive sheet.

6. A surveillance system according to claim 5, further characterized in that said signal detecting means is coupled to said microstrip antenna through an hybrid coupler for enabling said detecting means to be coupled to said space, and said means for propagating a microwave signal through said space comprises a source of said microwave signal coupled through said hybrid coupler to said microstrip antenna.

7. A surveillance system according to claim 5, characterized in that said strip conductor is generally pentagonal in shape.

8. A surveillance system according to claim 7, further characterized in that said signal detecting means is coupled to said microstrip antenna through an hybrid coupler for enabling said detecting means to be coupled to said space, and said means for propagating a microwave signal through said space comprises a source of said microwave signal coupled through said hybrid coupler to said microstrip antenna.

9. A surveillance system according to claim 2, characterized in that said electrode is polygonal with an indented margin along one border, said microstrip antenna is in the form of a strip conductor separated from a conductive ground plane by a dielectric layer, said strip conductor being disposed substantially in the plane of said electrode inset within the space embraced by said indented margin but spaced from said margin, said capacitor structure includes a conductive sheet laminated to said electrode with a layer of dielectric material therebetween, said source of low frequency signals is coupled between said electrode and said conductive sheet, and said conductive ground plane is formed by an isolated section of said conductive sheet.

10. A surveillance system according to claim 9, characterized in that said microstrip antenna along with said capacitor structure are covered with a layer of insulating material and integrated into a unitary floor mat structure.

11. A surveillance system according to claim 10 further characterized in that said signal detecting means is coupled to said microstrip antenna through an hybrid coupler for enabling said detecting means to be coupled to said space, and said means for propagating a microwave signal through said space comprises a source of said microwave signal coupled through said hybrid coupler to said microstrip antenna.

12. An assembly for use in a surveillance system in which the presence in a controlled space of a miniature electro-magnetic wave receptor-reradiator with signal mixing capability is detected by the combination of means for propagating through said space an electromagnetic microwave signal, a source of low frequency signals, an electrode coupled to said source of low frequency signals for disposition along the path of travel of said receptor-reradiator through said space for direct capacitive coupling to said receptor-reradiator whenever the latter is present in said space, signal detecting means arranged to be coupled to said space for receiving signals therefrom and detecting signals relating to said low frequency signals only when received as modulation on a carrier signal whose frequency bears a predetermined relationship to that of said microwave signals, and means coupled to said detecting means for providing an alarm responsive to detection of said signals that are related to said low frequency signals, said assembly being characterized by comprising in combination a conductive element and a strip conductor spaced from the margins of said element, said conductive element and said strip conductor being laminated to respective ground plane conductive layers with a layer of dielectric materials therebetween, means for effecting separate electrical connections to each of said conductive components, and layers of insulating material encasing said conductive components and dielectric material and integrating the same into a unitary floor mat structure, said conductive element constituting said electrode and said strip conductor constituting a microstrip antenna for propagating said signal through said space.

13. An assembly according to claim 12, characterized in that said conductive element is in the form of polygonal grid with an indented margin along one border, and said strip conductor is disposed within the space embraced by said indented margin but spaced from said margin.

14. An assembly according to claim 13, characterized in that said strip conductor is generally pentagonal in shape.

15. An assembly according to claim 12, characterized in that said strip conductor is generally pentagonal in shape.

* * * * *